June 17, 1952 D. R. YARNALL ET AL 2,600,822

RECORDING AND INCLUDING RESONANT VIBRATORY ASPECTS

Filed March 27, 1947 9 Sheets-Sheet 1

INVENTORS
David Robert Yarnall
James W. Williams 3rd
by [signature]
ATTORNEYS.

RECORDING AND INCLUDING RESONANT VIBRATORY ASPECTS

INVENTORS
David Robert Yarnall
James W. Williams 3rd
by
ATTORNEYS

INVENTORS
David Robert Yarnall
James W. Williams 3rd
by [signature]
ATTORNEYS

INVENTORS
David Robert Yarnall
James W. Williams 3rd
by [signature]
ATTORNEYS.

RECORDING AND INCLUDING RESONANT VIBRATORY ASPECTS

Filed March 27, 1947 9 Sheets-Sheet 5

INVENTORS
David Robert Yarnall
James W. Williams 3rd
By [signature]
ATTORNEYS.

RECORDING AND INCLUDING RESONANT VIBRATORY ASPECTS

Filed March 27, 1947

INVENTORS
David Robert Yarnall
James W. Williams 3rd
by BY [signature]
ATTORNEYS.

INVENTORS
David Robert Yarnall
James W. Williams 3rd
by [signature]
ATTORNEYS.

RECORDING AND INCLUDING RESONANT VIBRATORY ASPECTS

Filed March 27, 1947 9 Sheets-Sheet 8

INVENTORS
David Robert Yarnall
James W. Williams 3rd
by [signature]
ATTORNEYS.

June 17, 1952 D. R. YARNALL ET AL 2,600,822

RECORDING AND INCLUDING RESONANT VIBRATORY ASPECTS

Filed March 27, 1947 9 Sheets-Sheet 9

INVENTOR
David Robert Yarnall
James W. Williams 3rd.
by [signature]
ATTORNEYS

Patented June 17, 1952 2,600,822

UNITED STATES PATENT OFFICE 2,600,822

RECORDING AND INCLUDING RESONANT VIBRATORY ASPECTS

David Robert Yarnall, Philadelphia, and James W. Williams, 3rd, Ambler, Pa., assignors to Yarnall-Waring Company, Philadelphia, Pa., a corporation of Pennsylvania Application March 27, 1947, Serial No. 737,578

15 Claims. (Cl. 346—69)

Our invention relates to recorders primarily intended for indicating and recording water level in connection with steam boilers and the like, but suitable also for indicating and recording data of numerous other types.

A purpose of our invention is to reduce friction incident to recording and primary indication without increasing the complexity of the recorder.

A further purpose is to impose vibration suitably by electromagnetic mechanism axially upon a primary indicator shaft to reduce the bearing friction of the shaft.

A further purpose is to support a marker on the end of a pivoted arm by means having a particular natural frequency and to impose on the arm vibration at that natural frequency and preferably applied axially of the arm.

A further purpose is to employ a marker supporting arm which is resilient adjacent the pivot, relatively stiff between the pivot and the outer end and resilient at the end supporting the marker, to vibrate the arm preferably by alternating current electromagnetic impulses from an electromagnet applied to the resilient portion at the axis, and preferably to tune the resilient portion, at the end supporting the marker, to the vibration.

A further purpose is to mount the marker on a comparatively rigid arm by a V spring clip, one of the branches of the V being secured to the comparatively rigid portion of the arm and the other to the marker and to adjust the length of the free branch carrying the marker to a natural frequency which corresponds to the vibration applied to the arm.

A further purpose is to support a marker from a primary indicator shaft by an arm having an axially resilient connection with the primary element, obtainable, for example, by a reverse bend or offset in the arm normal to the axis of rotation, a stiff section between the resilient connection and the end and a resilient section on the end adjoining the marker, to mount an armature at the axis adjacent to the stiff section of the arm and on the opposite side of the resilient connection to the primary indicator shaft, and to vibrate the armature preferably by alternating current electromagnet means acting either from outside or inside the resilient connection.

A further purpose is to draw the marker from an inoperative position to an operative position adjacent the chart by electromagnet action on the marker arm and thereafter to vibrate the marker adjacent the chart by alternating current vibration from the electromagnet.

A further purpose is to employ a circular chart rotating about an axis and having a portion which curves to cooperate with the path of a marker preferably moving about an axis transverse to the axis of the chart.

A further purpose is to curve the radially outer upper portion of a circular chart and to move the marker about an axis transverse to the chart along a central vertical radial path of the chart.

A further purpose is to place the primary indicator shaft behind the chart, and to carry the reverse bend around the chart, the remainder of the marker arm being in front of the chart.

A further purpose is to damp the vibration by relieving the chart plate behind the chart and vibrating against the unsupported paper.

A further purpose is to maintain the chart paper resilient under the vibration.

A further purpose is to damp the vibration by maintaining the marker slightly out of resonance with the vibration source.

A further purpose is to vibrate the marker without breaking the ink stream or film between the marker and the chart paper.

Further purposes appear in the specification and in the claims.

In the drawing we have chosen to illustrate a few only of the numerous embodiments in which our invention may appear, the forms shown being chosen from the standpoints of convenience in illustration, satisfactory operation and clear demonstration of the principles involved.

Figure 12:
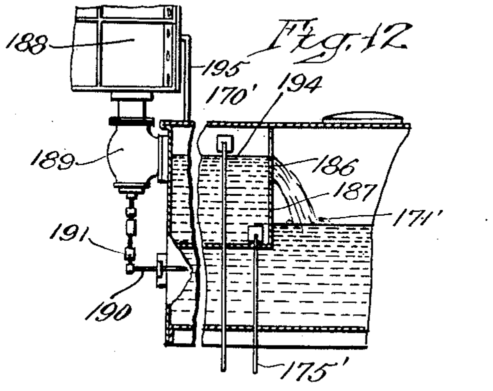
Figure 12 is a fragmentary elevation, partly in section, showing the invention applied to recording flow through a weir notch.
Figure 12A:
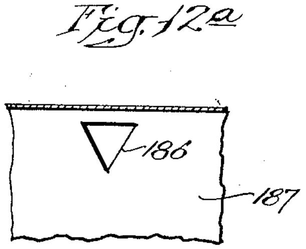

Figure 12ª is a view of the weir notch of Figure 12 in sectional elevation.

Figures 13 to 17 inclusive illustrate a modification in the recorder of the present invention.

Figure 13:
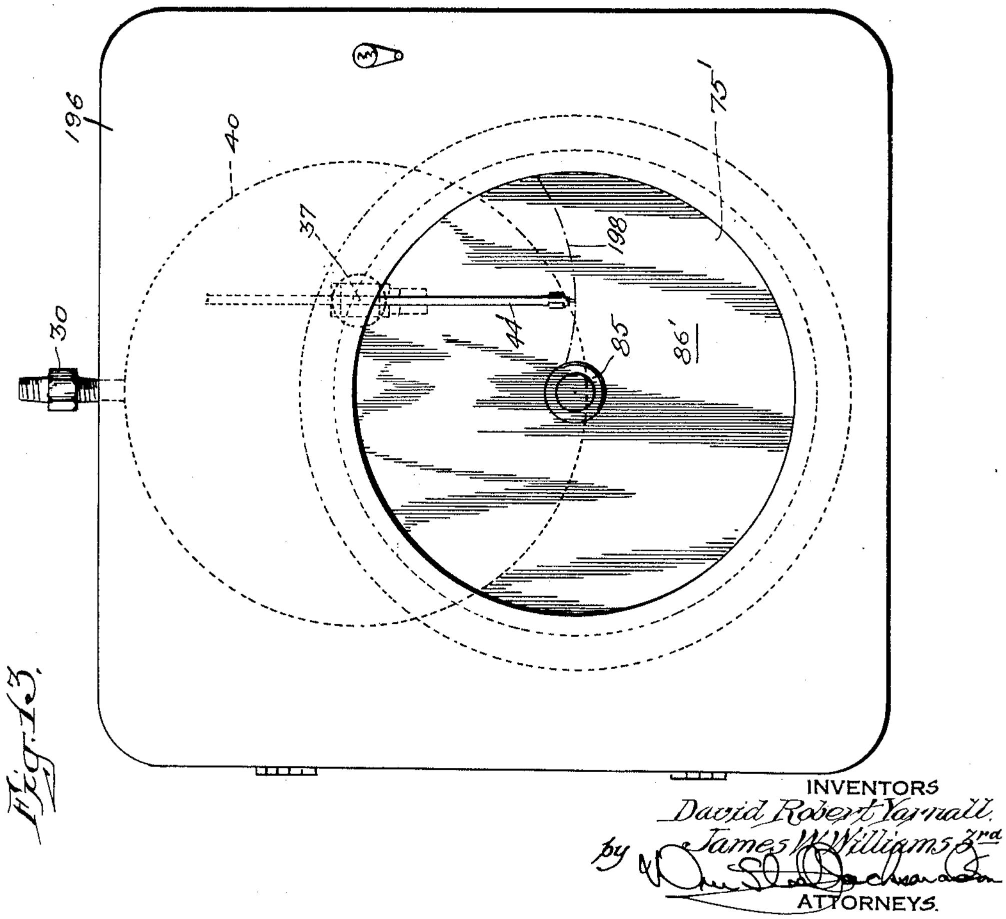

Figure 13 is a front elevation of the modified recorder.

Figure 14:
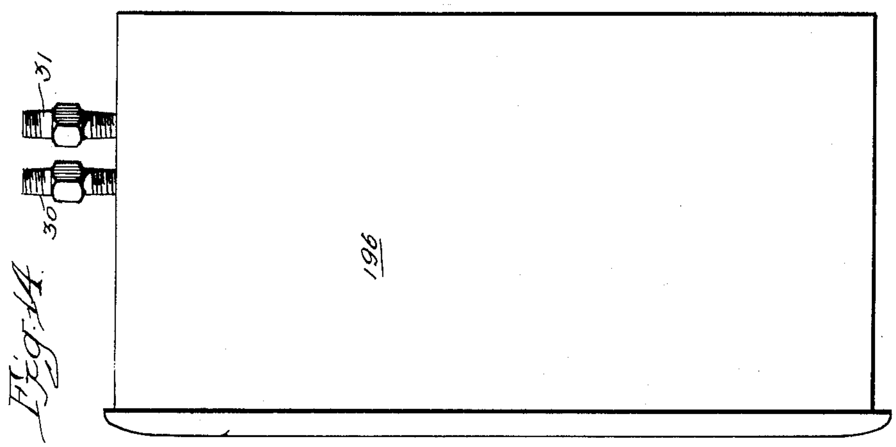

Figure 14 is an end elevation of Figure 13.

Figures 15, 17, 18, 19, 20:
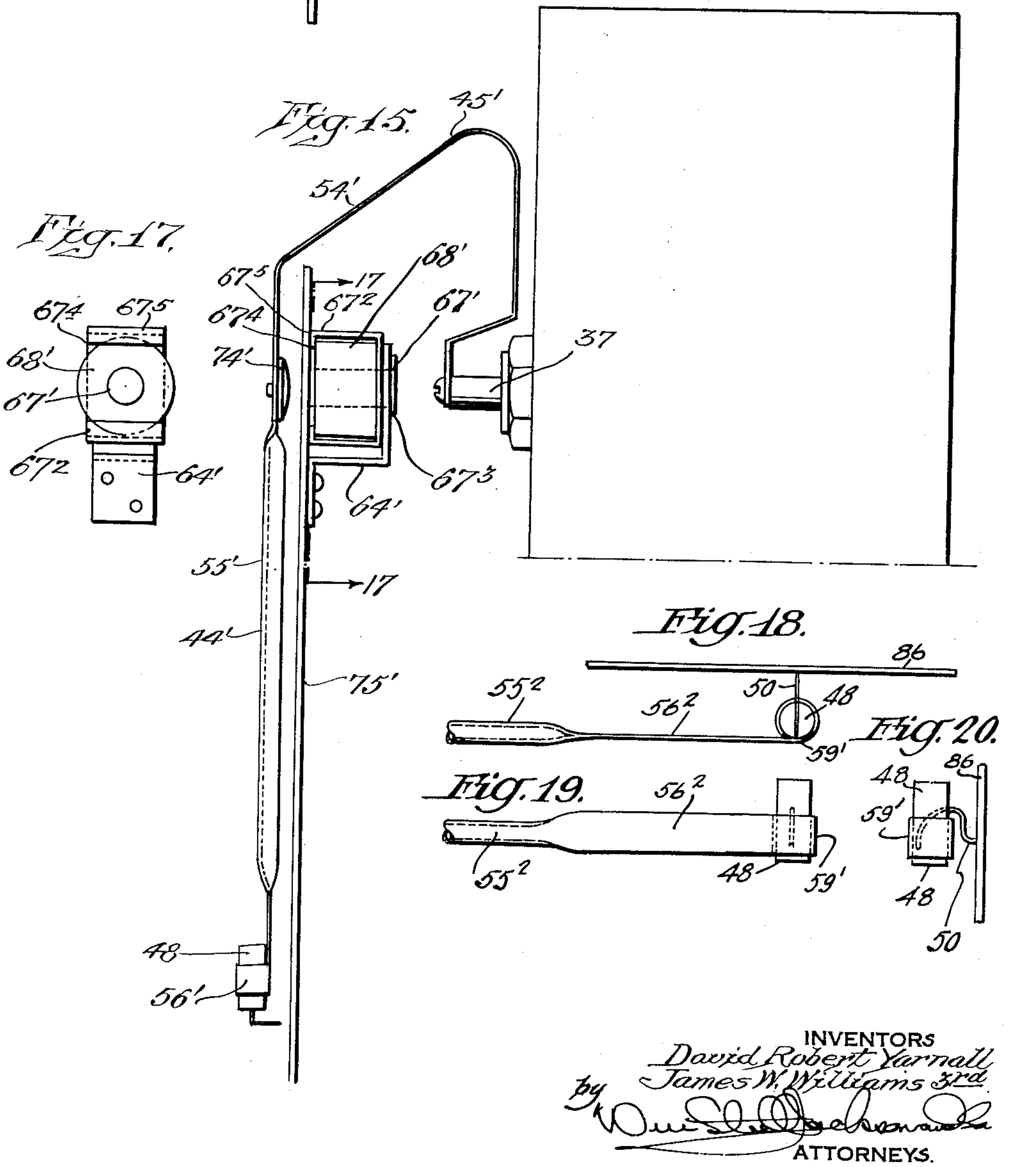

Figure 15 is a fragmentary detail side elevation of the marker arm and related structure.

Figure 16:
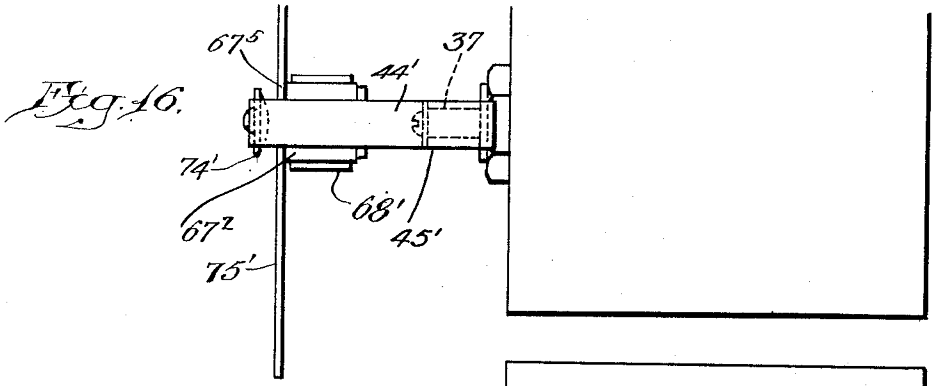

Figure 16 is a top plan view of the structure of Figure 15.

Figure 17 is a section on the line 17—17 of Figure 15.

Figures 18 to 20 illustrate a variation in the marker and recording arm.

Figure 18 is a fragmentary enlarged side elevation corresponding in position to Figure 15.

Figure 19 is a fragmentary front elevation of Figure 18.

Figure 20 is a fragmentary end elevation of Figure 19.

Figures 21, 22, 24 and 25 are fragmentary side elevations corresponding in position to Figure 15, and showing various alternate forms of axially resilient connections.

Figure 23:
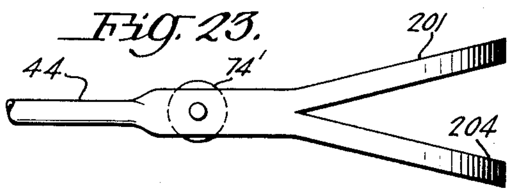
Figure 24:
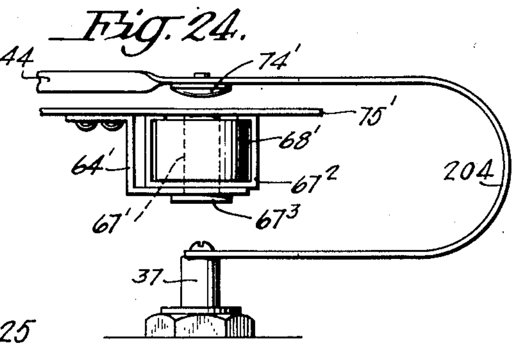

Figure 23 is a fragmentary front elevation of Figure 24.

Figure 26:
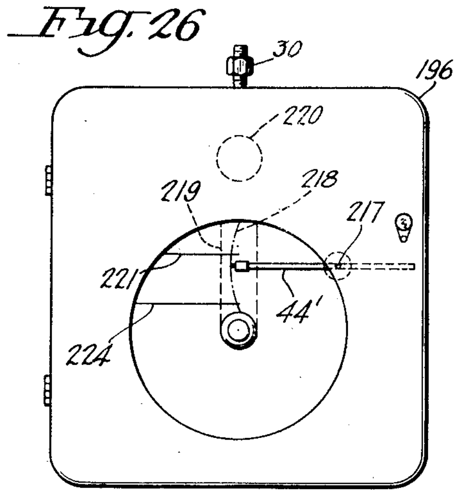

Figure 26 is a reduced front elevation of a variation in the recorder in respect to the position of the primary indicator axis, the relief of the chart plate and the illumination.

Figure 27:
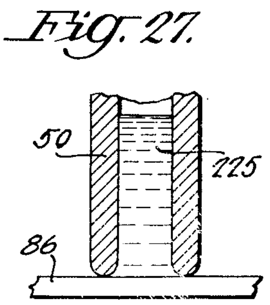
Figure 28:
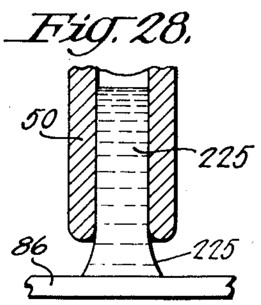

Figures 27 and 28 are enlarged longitudinal sections through the ink discharge tube transverse to the paper, at the extremes of a damped vibration cycle.

In the drawings like numerals refer to like parts.

Describing in illustration but not in limitation and referring to the drawings:

Where a primary indicator shaft is rotating in response to a quantity to be indicated, such as the level of liquid in a boiler, the flow through an orifice or over a weir, or any other quantity being measured and recorded, recording presents a difficult problem unless amplification of the energy of the primary indicator is to be used. While such amplification is often highly satisfactory and quite accurate, it usually adds considerably to the cost of the mechanism, and often increases the maintenance.

By the present invention it is possible to record the indication of a primary indicator without imposing any substantial frictional or other burden on the primary indicator, and often with actual reduction in the friction. In general we provide a simple arm mounting for a marker such as a pen on the primary indicator shaft, designing the arm so that it will transmit very effective vibration to the marker and thereby greatly and continuously reduce the friction between the marker and the paper or other material of the chart.

Considering first the recording mechanism of Figures 1 to 5 inclusive, these figures illustrate a case 25 having a door 26 provided with a transparent window 27 for viewing a recorder 28. At the opposite end of the case an indicator 29 is provided, suitably connected by nipples 30, 31 to a source of pressure differential which determines the indication as later explained.

Figures 1, 5:
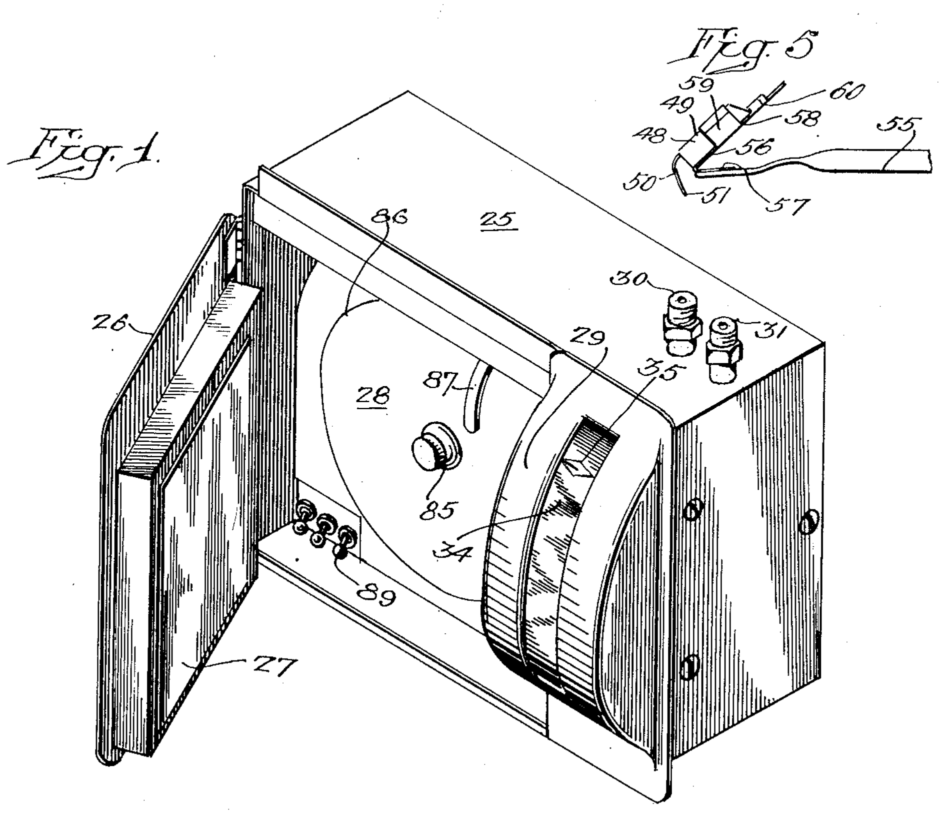
Figure 1 is a perspective of our novel primary indicator and recorder, with the front of the recorder open.
Figure 5 is a detail elevation of the end of the marker arm showing the marker.
Figure 4:
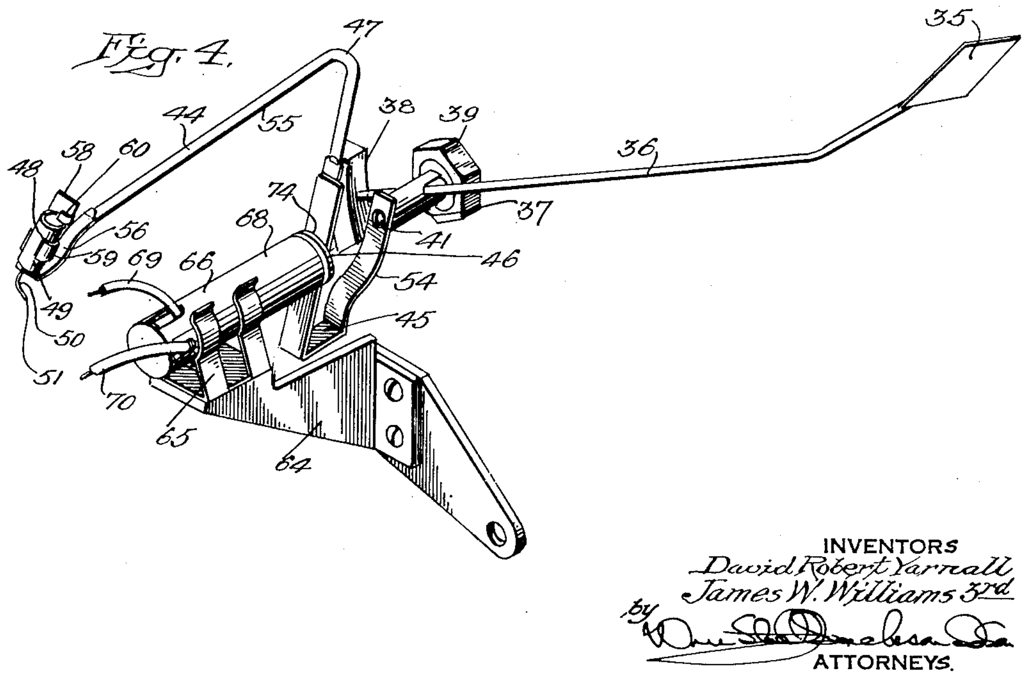
Figure 4 is a detail perspective showing the marker arm, vibrator and indicating arm.

The indicator 29 has a window 34 through which may be viewed an indicator pointer 35 mounted at 36 on a primary indicator shaft 37 and suitably counterweighted at 38. The primary indicator shaft 37 turns in suitable bearings 39 on a primary indicator housing 40, described in detail below. Suitably mounted as by screw 41 on the end of the primary indicator shaft 37, a marker arm 44 is provided, preferably made of nonmagnetic material. The marker arm has a resilient connection such as a reverse bend 45 which passes back across the axis of the primary indicator shaft 37 at 46. It is then conveniently bent again at right angles at 47 in this form, and at its outer end supports a marker 48, which may be of pencil or crayon type, but will preferably be a pen of the common type used in recording, in which case there will be an ink reservoir 49, an ink discharge tube 50 and a pen point 51 as best seen in Figure 5.

The marker arm 44 in the preferred form essentially comprises three portions. The axially resilient portion 54 illustrated in Figure 4 in the form of a reverse bend may consist of a spring preferably of beryllium copper, Phosphor bronze or other nonmagnetic spring material, sufficiently resilient to form a hinge portion and permit the marker arm to move under the action of the magnetic force. The portion 55, which may be welded or otherwise attached to the resilient hinge portion 54, is preferably of thin walled stainless steel tubing, aluminum or other light metal, and is, as compared to the axially resilient portion 54, quite rigid and unyielding under the forces encountered. The support 56 from the arm for holding the marker is a spring of beryllium copper or other suitable spring material. As best seen in Figure 5, the spring 56 is suitably of V shape, having one arm 57 secured to the portion 55 as by welding or brazing, and the other arm 58 holding the marker in suitably resilient clips 59 preferably integral with the material of the spring 56.

The spring 56 is selected to have, with the particular marker, a natural frequency or natural period of vibration generally corresponding with the alternating current frequency which will be used for purposes of vibration, and the marker is suitably positioned along the arm 58 to tune the mechanism to any suitable harmonic of this frequency.

Thus if the alternating current is at 60 cycles, the spring 56 should have a natural frequency suitably close to 60 cycles or some harmonic (multiple) thereof. The natural frequency of the spring can be controlled by varying its length and by the position of the marker. These final relations are best determined experimentally. The stop 60 is provided to register the marker in its correctly determined position.

Suitably supported from the housing 40 as by bolts 61, a bracket 64 is provided, having convenient resilient mounting clips 65. In the clips 65 an electromagnet 66 is mounted, having a core 67 and a coil 68, with terminals 69, 70 connected to an alternating current source 71 suitably at 60 cycles and 110 volts. The electromagnet is aligned as shown on the axis of the primary indicator shaft 37, facing the arm 44.

To the arm 44 an armature 74 suitably of soft iron is welded, brazed or otherwise attached. The armature 74 is suitably of button formation and is disposed centrally with respect to the axis of the primary indicator shaft 37 when the marker is in marking position.

A chart plate 75 is employed, conveniently having a straight portion 76 which includes the center of the chart plate at 77, and a curved portion 78 which follows the curvature of the path of the marker arm about the axis of the primary indicator shaft 37 from some point 79 far out on the radial path to some point 80 close to the center of the chart plate. Thus it will be seen that as the marker arm moves the marker over the curved path, best seen in Figure 3, from the point 79 to the point 80, the marker conforms to the curvature of the chart plate.

Near the center of the chart plate is located a chart rotating motor 81 of well known type, interconnected to the chart by a speed reduction drive 84, the drive carrying on the outside of the chart plate a locking hub 85 for engaging a chart 86 and rotating the same. The motor is mounted on bracket 64. As best seen in Figure 1, the chart 86 is circular but conforms to the shape of the chart plate, resting flat against the chart plate at the flat portion 76 (Figure 3) and curving over the curvature of the chart plate as the chart rotates over the curved portion 78. To hold the chart against the front of the chart plate at the curved portion, a curved finger 87 is provided, extending down from the top slightly in front of the chart plate and out of line with the axis of the chart.

Figure 2:
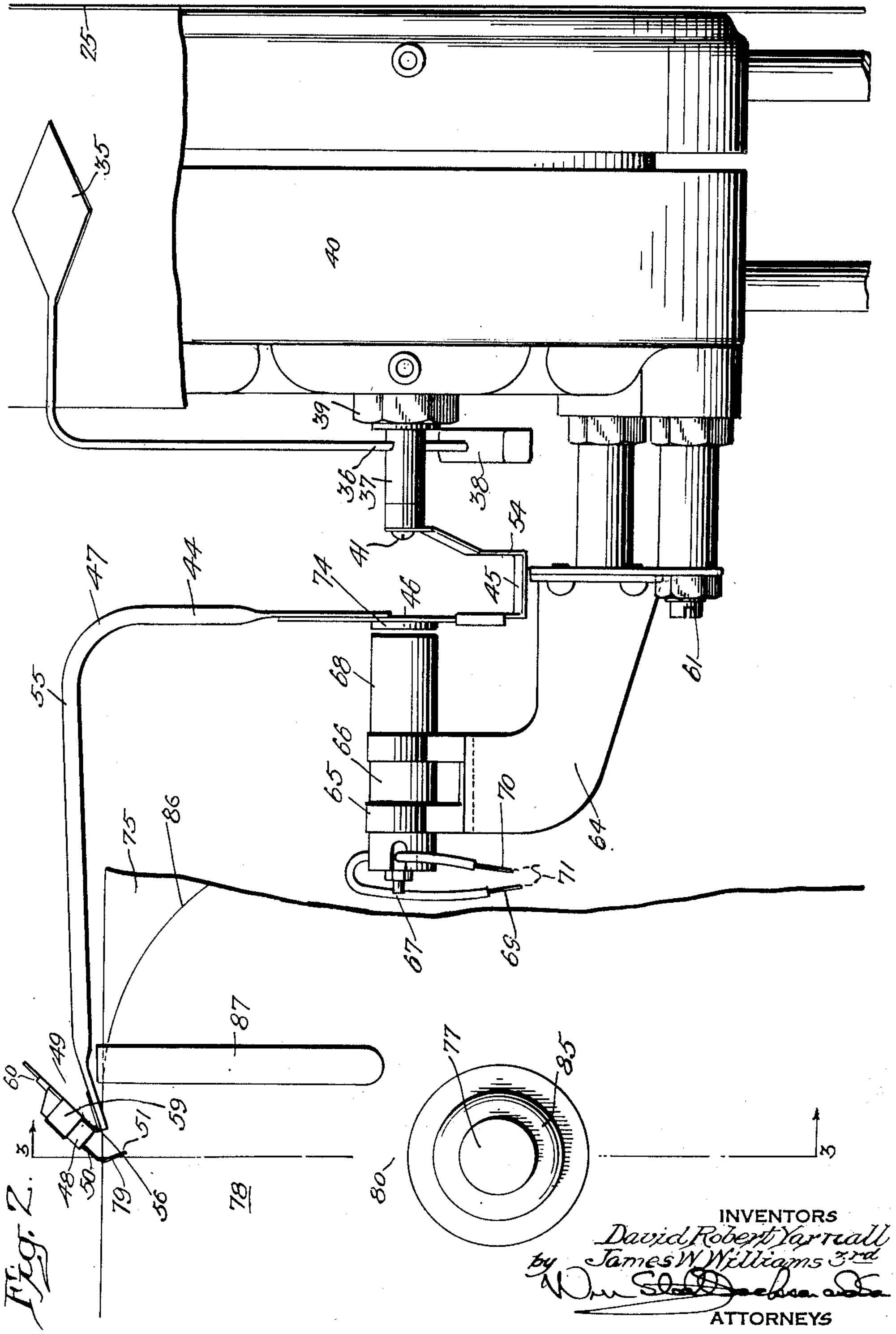
Figure 2 is a front elevation with the recording chart and the indicator window broken away.

The chart plates may be formed from sheet metal along conventional lines or they may be made of transparent or translucent material such as acrylic or urea-formaldehyde plastic. In the latter case, the chart may be illuminated by an electric lamp from behind and the record and chart markings will stand out in relief. Movement of the marker arm causes the marker to move radially with respect to the chart, preferably along the central vertical radius in vertical line with the axis of the chart, as best seen in Figure 2. In this way the device is entirely symmetrical. It will be evident as best seen in Figure 3 that the indicator 35 and the marker arm need not have either the same radii or the same angular position at any moment.

Figure 3:
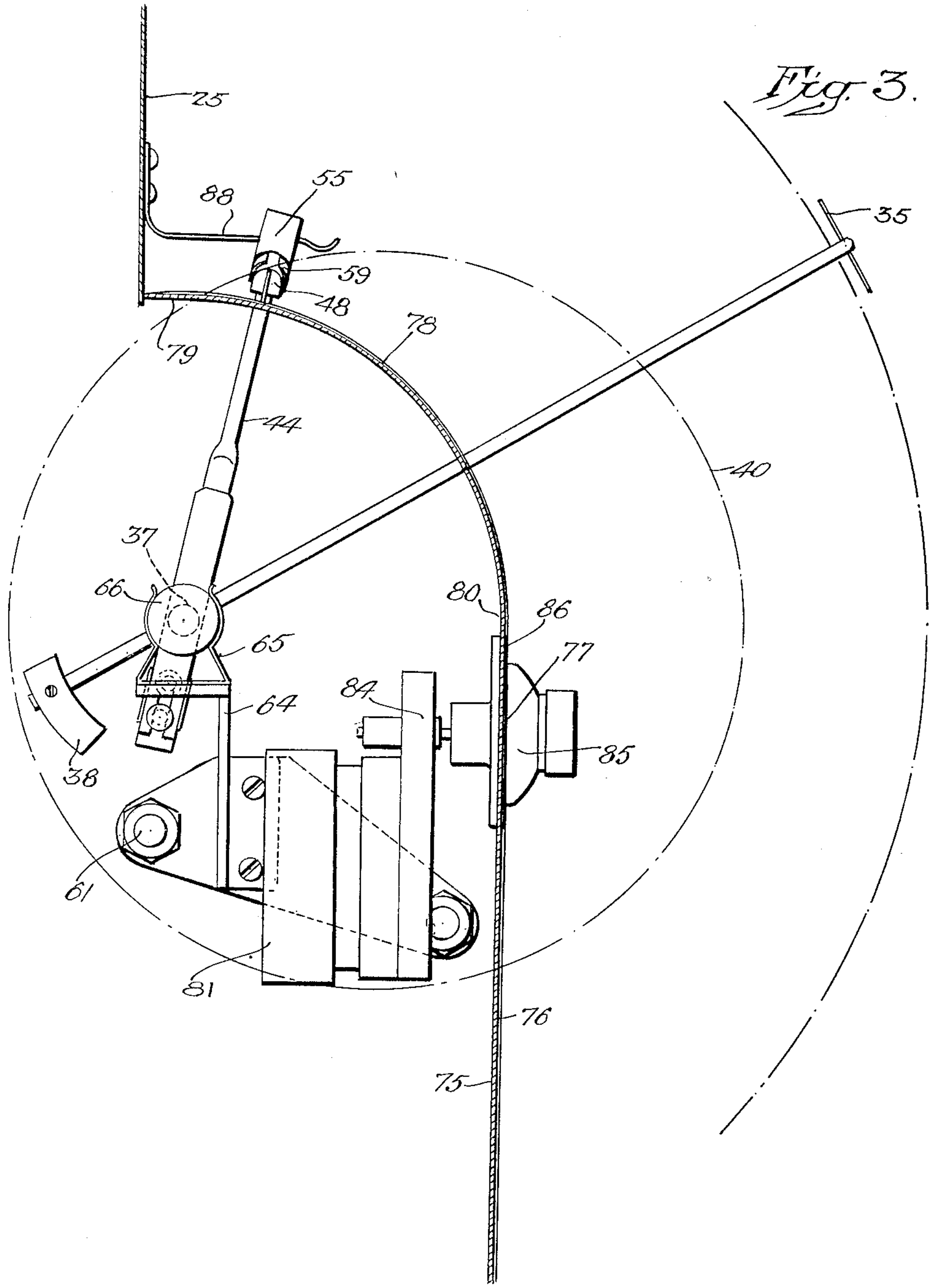
Figure 3 is a section on the line 3—3 of Figure 2.

A spring clip 88 is mounted on the case 25, Figure 3, to retain the marker arm in an inactive position while changing charts, or to provide clearance for the chart plates when it is necessary to pull the chart plate forward for the purpose of effecting adjustment to the instrument.

The device of the present invention imposes very little extra work requirement on the primary indicator.

In operation, once the chart is properly mounted with its upper portion conforming to the curvature of the chart plate, and with the chart driving motor turning the chart, the primary indicator can be thrown into operation by any suitable mechanism such as that later described. This will bring the marker arm to the proper angular position for marking, but will not bring the marker into contact with the chart due to the fact that the spring at 54 holds the armature 74 slightly away from the electromagnet, and holds the marker slightly raised from the chart. As soon as the connection to a source of alternating current is made, as by throwing a switch 89, the armature 74 is drawn in close to the electromagnet, bringing the arm into a position in which the marker touches the paper of the chart. Throughout the operation the marker remains practically against the chart, but vibrates back and forth toward and away from the chart through a very short distance, suitably of the order of $\frac{1}{64}$ of an inch. At the same time the armature 74 moves back and forth very slightly toward and away from the electromagnet, but always very close thereto.

The spring portion 54 functions as a hinge, allowing the rigid portion 55 of the arm to transmit vibration to the spring clip portion 56, thus tending to vibrate the marker. Due to the fact that the marker is mounted on the clip in a position such that the natural frequency of the marker and clip corresponds to the frequency of the alternating current used in vibration, the marker will vibrate with noticeable amplitude while the arm 55 appears to the eye to be entirely stationary.

When it is indicated that the natural frequency or tuning of the marker and clip combination corresponds to that of the alternating frequency, it is not meant necessarily that it is identical with the 60 cycle or other frequency used, but it is intended that it will either approximate that of the frequency used, or of a harmonic thereof, as well known in the art. Thus the natural frequency might be a multiple of the 60 cycles if 60 cycle alternating current be employed, such as 120, 180, 240 cycles, etc. In cases where the amplitude of vibration of the marker exceeds that desired for the most satisfactory operation, it becomes advantageous to vary the natural frequency of the marker assembly to slight variance with the applied frequency of vibration. This effects a decrease in amplitude of the marker movement to that desired.

It will be evident that direct connection between the primary indicator and the marker has been provided, since the marker arm is directly mounted on the primary indicator shaft and directly follows the motion of that shaft. A single simple moving element thus provides both the indicating and recording function. While the load on the primary indicator bearings is increased somewhat, the same contact between bearing surfaces is used as where the indicator alone is employed, thus minimizing additional friction. Since the indicating and recording arms are on the same shaft, it is very simple to find the desired relation between the indicating scale and the recording scale to regulate the distance of the marker from the center of rotation of the primary indicator.

The marker being mounted on the spring clip at the end of the supporting arm, it is very easy to control contact pressure of the marker on the paper within the limits which produce optimum performance. The constant vibration moves the pen from the paper and greatly reduces the friction against the paper, and also aids in ink flow. At the same time the vibratory action compensates for errors in the curvature or surface of the chart plate or of the paper of the chart, and for slight misalignments of the indicating and recording mountings, which might otherwise cause the recording arm to jam or catch.

The constant vibration introduced by the electro-magnet continuously produces interruptions both in pen-paper contact and also in bearing contacts on the primary indicator shaft, thus improving bearing lubrication and, on actual test, reducing bearing friction.

Due to the fact that the contact between the pen and the paper is interrupted at a suitably rapid rate, there is no marker friction during the noncontact interval, and the indicating and recording elements can respond with the same degree of accuracy of indication as would occur if the marker did not contact the paper. The effect of the intermittent vibratory contact with the paper is merely to damp the response but not to affect the accuracy of the final position reached.

The vibration extending axially to the bearings of the primary indicator tends to lower the average bearing friction to such an extent that based upon observations it is found that there is higher sensitivity with the recorder unit attached and operated than with the indicator alone. The explanation appears to be that the vibration temporarily reduces bearing pressure at a given point and alternatively improves bearing lubrication with resilient freedom of motion.

The fact that the electromagnet pulsations on the primary indicator are axial thus prevents the development of components of force transverse to the axis of rotation. The pulsations do not in any way influence the accuracy of indication. The amplitude and frequency of the vibration simply controls the amplitude and frequency of the vibration of the primary indicator shaft in the direction of its axis, and simply controls the motion of the marker toward and away from the paper (in a direction which is unimportant from the standpoint of measurement of the quantity which is recorded).

The flux of the electromagnet acts symmetrically upon the armature 74.

Since the device is designed so that in case of current break the spring 54 lifts the marker away from the paper, the mechanism remains free from marker friction in case of interruption of the current. Therefore under these conditions the only load imposed by the recorder would be the weight of the marker arm and marker.

The circular chart as shown records along the vertical center line of the upper portion, with the lowest recorded point on the chart located slightly above the center of rotation of the chart. This permits the chart and chart plate to be of the conventional vertical form except in the upper curved portion where the usual circular chart conforms to the curvature. The conventional chart drive can be used, since the chart axis is located below the curvature.

This chart construction provides more convenient visibility of the most recently recorded data on the chart, since the most recently recorded data is at the top and readily visible to a person looking in through the window. In cases where the non-transparent type of chart plate is used, the greater projected area of the upper part of the chart provides better illumination from an electric lamp or the like concealed in the upper forward part of the instrument housing.

It will be evident that in the form just described the electromagnet operates from outside the reverse bend of the marker arm, but, as later described, an electromagnet can equally well operate in the opposite direction, in either case being on or substantially on the axis of the primary indicator.

While the recorder of the present invention is of general utility, it is particularly useful with a primary indicator of liquid level, flow or the like of the type contained in Walter J. Kinderman U. S. applications Serial No. 517,242, filed January 6, 1944, now Patent No. 2,509,644, dated May 30, 1950, for Differential Pressure Gage, and Serial No. 713,035, filed November 29, 1946, for Meter. In these devices angular motion from a primary indicator shaft is transmitted without substantial frictional loss from a closed space in response to pressure differential or the like within the space.

Figure 6:
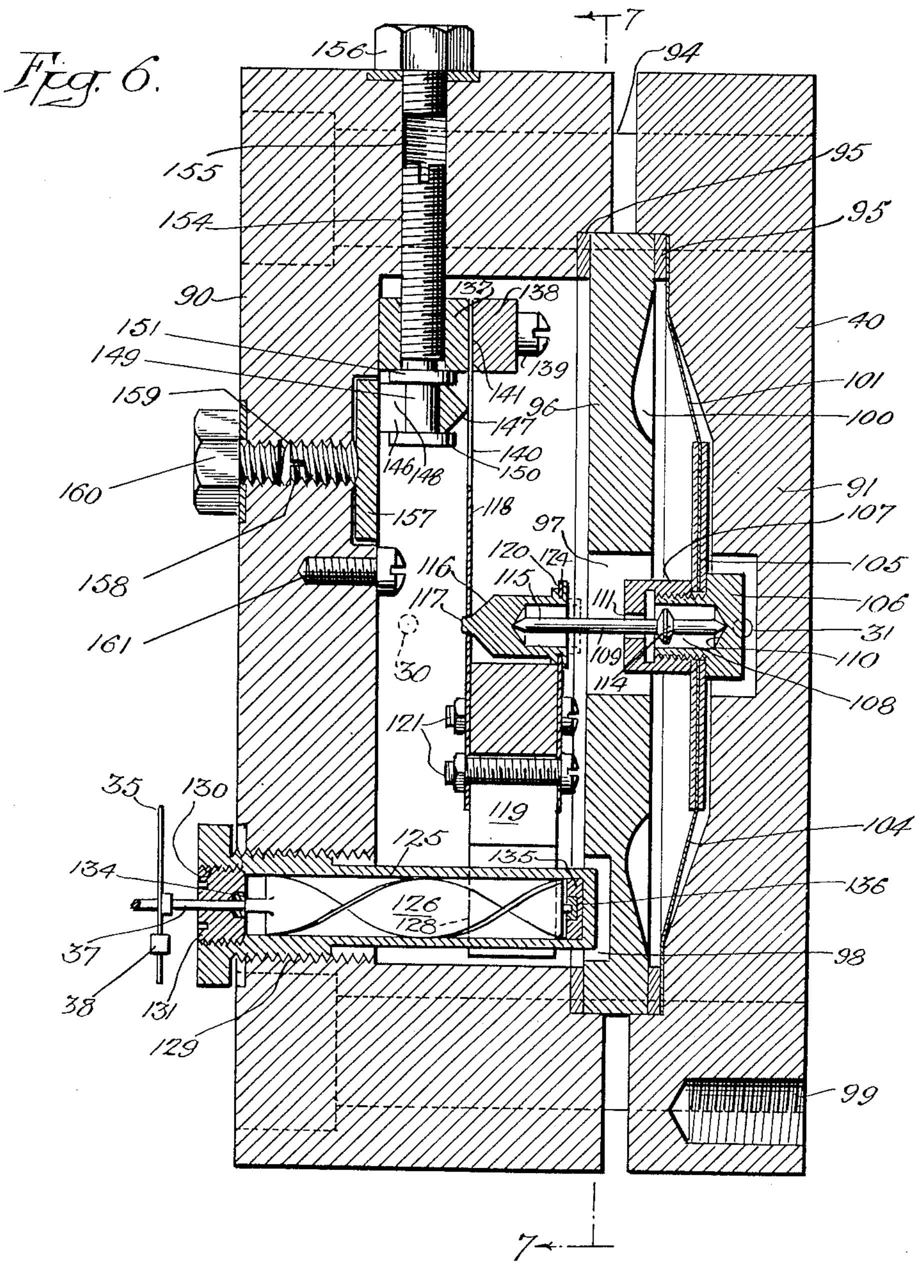
Figure 6 is a central vertical section through the primary indicator.
Figure 7:
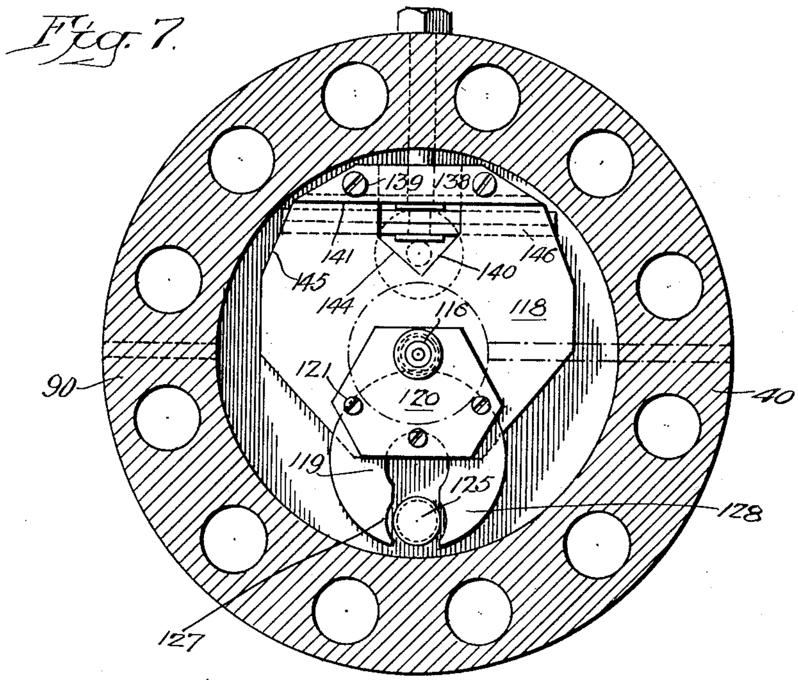
Figure 7 is a section of Figure 6 on the line 7—7 to reduced scale.
Figure 8:
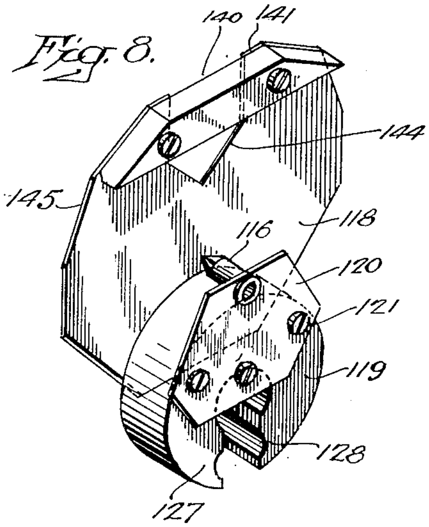
Figure 8 is a detail perspective of the horseshoe magnet and support for the primary indicator.

The housing 40 of the indicator as best seen in Figures 6 and 7 comprises a body 90 and a cover 91 united by bolts 94 and sealed by annular packing 95 on opposite sides of a diaphragm support apertured at 97. The diaphragm support for convenience is recessed at 98 on the side toward the body 90 in order to permit a well, later to be described, to fit into the recess. The housing is mounted in any suitable position, such as vertical, by a bolt entering threaded opening 99. On the side toward the cover, the diaphragm support is recessed at 100 to permit collapse into this space of an annular transversely free flexible diaphragm portion 101 of a diaphragm 104. The diaphragm is held at its outer edge by the packing 95 which protects against leakage between the support and the cover. At the center the diaphragm is stiffened by diaphragm plates 105 which are united by threaded members 106, 107, recessed at 108 to receive a thrust pin 109 engaging in a conical socket 110 and extending through an opening 111 in the threaded member 107. The pin 109 carries a collar 114 to prevent accidental removal of its end from the space 108.

The diaphragm 104 is subjected to differential pressures on opposite sides through nipples 30, 31. The pressure upon the outer face at 31 is a standard pressure in the liquid level measurement form, which should be equal to or greater than the pressure obtained due to the highest level of liquid indicated.

At the opposite end, the thrust pin 109 engages within a cavity 115 of a thimble 116 which is mounted as by peening at 117 on a leaf spring 118. The spring provides a convenient support for a horseshoe magnet 119. The spring supplies effective retardation for the movement of the magnet. The horseshoe magnet 119 is conveniently mounted on the spring by extending a plate 120 over the magnet and thimble and bolting through the plate, magnet and spring at 121. The thimble may conveniently be peened over at 124 to unite to the plate.

The motion of the magnet is transmitted to the primary indicator shaft 37 through a pressure wall or well 125 of suitably nonmagnetic material, which surrounds a magnetically susceptible rotatable armature 126 of spiral formation which is external of the housing 40 in the sense that it is not subjected to the pressure of the housing. The magnetic transmission is based upon the change of reluctance of the magnetic path with movement of the magnet at right angles to its flux and along the axis of the armature, accompanied by rotary reaction of the armature to the magnet movement to reestablish the reluctance of the magnetic circuit at a balanced position.

The magnet 119 is preferably a permanent magnet of highly magnetic alloy having curved poles 127, 128, which effectively surrounds the well 125, with suitable clearance to permit movement longitudinally of the well. A suitable magnetic alloy is Alnic (24 to 30% nickel, 9 to 13% aluminum, balance iron) or Alnico (20% nickel, 12% aluminum, 5% cobalt, balance iron) as well known in the art.

The well is threaded at 129 into the housing and internally threaded at 130 to receive a threaded plug 131 which holds a jewelled bearing 134 for the primary indicator shaft 37. At the opposite end of the well an insert 135 holds an opposite jewelled bearing 136 for the opposite end of the armature 126.

Figure 9:
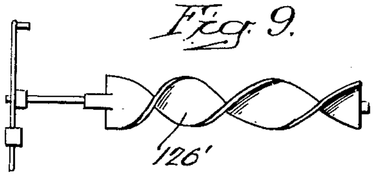
Figure 9 is a detail side elevation of a variant primary indicator spiral.

In Figure 6 the armature 126 is of uniform spiral pitch throughout. However in many cases the variation in pressure and the like which comes to the housing 40 may not uniformly follow the quantity being indicated, such as liquid level or flow, but may be a nonuniform function thereof, as for example where the device depends upon the law of a weir. In such cases the pitch of the spiral may be made nonuniform, increasing or decreasing in either direction or agreeing to any predetermined law as shown at 126' in Figure 9. This will permit use of a uniform indicator scale, and making of uniform recordings on a chart, notwithstanding that the pressure variation is nonuniform.

The armature may preferably be made of soft iron or low carbon steel, such as Swedish iron or so-called "core" iron. Silicon bronze has been found to be satisfactory as a nonmagnetic material for the well 125. It has been found that the relation of the spiral pitch to the magnet thickness should be relatively high. A 4 to 1 relation gives good results and a 3 to 1 relation is acceptable.

Provision is made for adjustment of the fulcrum of the spring 118. Movement of the fulcrum edge normal to the plane of the spring controls the zero setting, while movement of the fulcrum edge along the surface of the spring parallel to the spring length changes the unsupported spring length and therefore changes deflection characteristics. This is equivalent to calibration for range of liquid level travel or range for a given indication.

The spring is desirably supported at its rear end between a transverse block 137 and its cap 138, both held together by bolts 139. If the supporting spring were of the same thickness and width throughout its length, the possible adjustment in range of movement due to fulcrum adjustment would be relatively small. To increase the effect of change in fulcrum, the spring can be varied in thickness or, as is more convenient in production, can be varied in width where it is bent. The spring is accordingly made wide and is slotted at 140 adjacent the supporting end 141, and the walls adjacent the bifurcation are tapered oppositely at 144. The outer walls are tapered inwardly and upwardly toward the upper end at 145.

Although the spring is at all times supported by the block and the cap, the effective length of the spring is determined by an adjustable fulcrum in the form of a bar 146 having a knife edge 147 extending across the spring. The bar 146 is movable transversely of the length of the knife edge. The bar 146 is slotted transversely at 148 from the back so as to permit it to be slid from the right in Figure 6 upon a barrel 149 of a spool 150 having flanges 151. The spool is rigid with a screw 154 threaded into the housing 49 and into the block 137. The screw is accessible for turning through an opening 155 closed by a closure bolt 156. A disc 157 on screw 158 mounted in the housing behind the bar 146 moves the bar to the left or right in Figure 6 and correspondingly moves the fulcrum. Access to the screw 158 is provided through an opening 159 closed by a closure bolt 160. Since the setting of the zero point of the indicator is dependent upon the position of the magnet to the right or left in Figure 6, the zero point can be adjusted by advancing or retracting the disc 157. A set screw 161 prevents lowering of the bar 146 beyond the limit of adjustment.

In operation, the device of Figures 6 to 9 is controlled by motion of the diaphragm under differential pressure, which causes the pin 109 to move the horseshoe magnet 119 against the retardation of the spring 118. Movement of the horseshoe magnet surrounding the well causes the armature 126 to rotate and thus turn the primary indicator shaft 37.

Figures 10, 11:
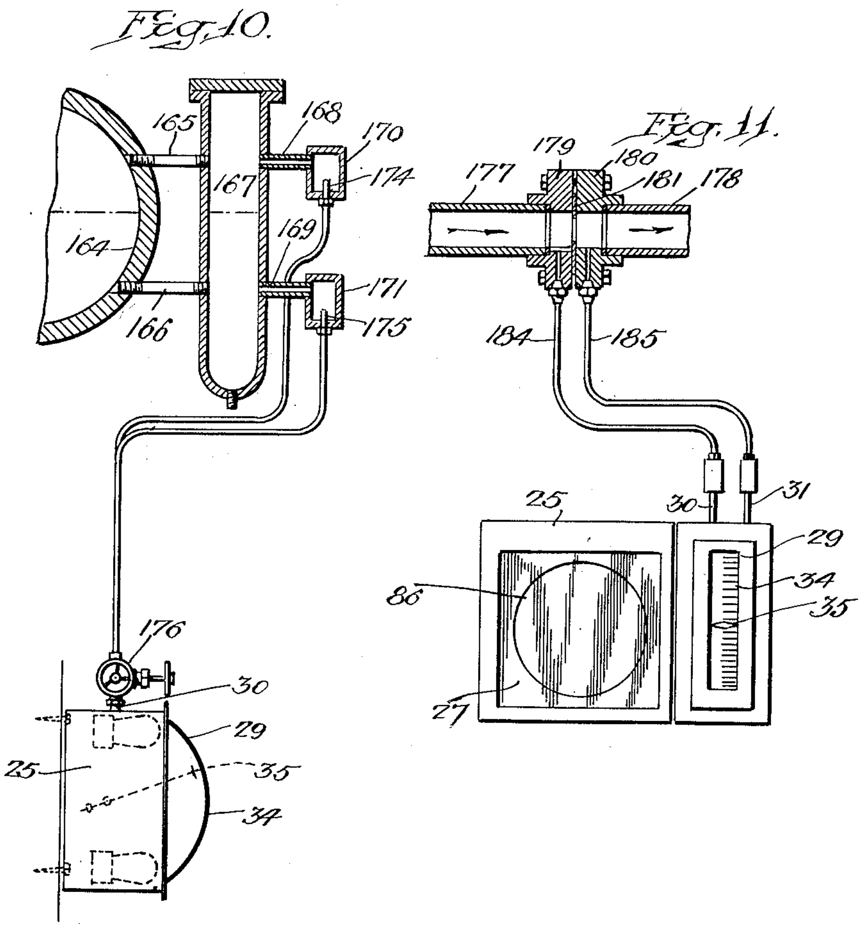
Figure 10 is a diagrammatic elevation, partly in section, showing a recorder according to the invention applied as a liquid level recorder in a high pressure boiler, with the recorder located in position to be read from the floor.
Figure 11 is a diagrammatic elevation, partly in section, showing the invention applied to flow meter measurement of a liquid passing through an orifice.

In Figure 10 the mechanism is shown applied to a steam drum and water column by which water level differences are indicated by differences in pressure on the indicator and are recorded on the recorder. The steam drum (boiler) 164 is connected by pipes 165, 166, one reliably above and one below the water level, with the water column 167 from which pipes 168, 169, again one reliably above and one reliably below the water level, connect with pressure pots 170, 171. From these pressure pots, pipes 174, 175 lead to opposite sides of a diaphragm 104 as shown in Figure 6.

In this form the pipe connection 175 carrying varying pressure communicates with the nipple 30 at the left hand side of Figures 1 and 6. The pipe 174 communicates with the opposite side of the diaphragm in Figure 6. As the variant water level communicating with the lower pressure pot 171 drops, the pressure difference with respect to the constant level in pressure pot 170 increases and the magnet is shifted along the well toward the indicator, that is, outward along the armature, so as to give progressively lower indication for lower variant water level.

In Figure 10 the two pipes 174, 175 are closed or opened by valves 176.

In Figure 11 the flow pipe 177 and 178 is interrupted to provide flanged terminals 179, 180 bolted together about an orifice plate 181. The flow pipe is attached on opposite sides of the orifice plate to pipe the pressure from opposite sides of the orifice to the indicator and recorder. It will be recognized that in the form of Figure 10 the pipe 174 represents a standard maximum pressure pipe, maintained at maximum pressure by condensation, and containing a constant head reliably above the level of the water in the steam drum. However, both of the pressures in the flow pipe form of Figure 11 fluctuate and the intermediate transmission of the indication or the interpretation—for example calibration—of the indicator must take into account the law of variation between the two pressures with different pressure values and different quantities of flow. In Figure 11 the pipes 184, 185 are connected to the respective nipples 30, 31 on the indicator and recorder.

In Figure 12 the invention is applied to recording fluid flow or indicating merely the rate of flow of a liquid through a weir meter, a form of weir being shown at 186 in weir plate 187 of Figure 12[a].

The water in open feed water heater 188 passes through a valve 189 controlled by any storage space float, not shown, through a rocker shaft 190 and rocker arm 191 so as to control the supply of water from the heater entering the weir and affecting water level 194. Steam pressure in the heater and meter are equalized by pipe 195.

The illustration in Figure 12 is modelled generally after the illustration in Figure 1 of Yarnall U. S. Patent No. 1,143,344, issued June 15, 1915, and from which patent other mechanism normally associated with that shown in Figure 12 may be seen, and its operation as well as that of the parts shown in Figure 12 may be checked and further explained. Other Yarnall patents showing structure to which this invention may be applied are 1,159,147 to 1,159,150; 1,178,463; 1,200,684; 1,307,609.

In connection with the type structure shown in these Yarnall patents, pressure pots 170' and 171' of the character shown in Figure 10 are used to carry vapor space pressure as a standard, and variant pressure of the water which is above the weir, through pipes 174', 175' to the nipples 30 and 31.

The differences in water level yield corresponding differences in pressure in pipe 175' but do not give a true indication of the quantity or rate of flow, since interpretation of water level into rate or quantity of flow involves application of the $\frac{5}{2}$ power or other law of the weir according to the shape of the weir selected. An armature of the type shown in Figure 9 may be used to obtain direct readings and recordings from a weir having a nonuniform function in terms of flow.

The invention may also be applied to a recorder having a flat chart, and to one in which the electromagnet is within the return bend of the marker arm, rather than outside the return bend as in the form of Figures 1 to 5 inclusive. Figures 13 to 17 inclusive illustrate a device of this character.

In this form the case 196 mounts a chart 86' against a chart plate 75', in the front of the case. with the axis of rotation of the chart running directly front and back in the case and terminating in a tightening hub 85 on the end of the chart rotating shaft driven by mechanism identical with that described in reference particularly to Figure 3.

The indicator, identical with that already described, is placed at right angles to the position in Figures 1 to 5. As seen in Figures 13 and 15, the primary indicator shaft 37 is parallel to the axis of rotation of the chart, the primary indicator shaft being preferably located slightly above and to one side of the chart so that the marker arm 44' will describe on the chart a curved path 198, as well known.

As best seen in Figures 15 and 16, the chart plate 75' extends into the space in prolongation of the primary indicator shaft 37 and suitably consists of some nonmagnetic and preferably transparent material such as acrylic or urea-formaldehyde plastic. The marker arm 44' has a slightly different form of reverse bend 45', resilient as previously described, and has its armature 74' facing toward the inside of the reverse bend as seen in Figure 15, rather than facing outwardly as in Figure 4. The portion 54' may be a beryllium copper spring. The stiff portion of the marker arm 55' may be substantially identical with that of Figures 1 to 5 inclusive except that the bend 47 is not needed and the portion 55' can be straight as shown.

The marker (pen) 48 may be identical with that previously described, but in this form a straight spring clip 56' is used, properly tuned to the desired frequency and for a given position of the marker along the clip, rather than a V clip as in the form previously described. The clip may be attached to or integral with the stiff portion 55'.

In the simple form shown on Figures 18, 19 and 20, the tube member 55² is flattened at the end to form the spring clip member 56² and the pen holder 59'. The required degree of resonance with the imposed vibration is obtained by controlling the length of the flattened section.

The electromagnet as here used is placed inside the return bend on the axis of the primary indicator which presses through the armature 74', rather than outside the return bend as in the other form. In mounting the electromagnet it is convenient to support it by a bracket 64' from the chart plate 75'. Also in this form the electromagnet is provided not only with a coil 68' and iron core 67' running through the center of the coil, but also with an iron magnetic circuit element in contact with the core at the back at 67³ and providing gaps at the front at 67⁴ whose air gap will be reduced by attraction of the armature 74' when alternating current of the selected frequency is passed through the electromagnet. The return flux path 67² is suitably provided with pole pieces 67⁵ at its outer end, as best seen in Figure 17, or by means of any other suitable return flux shell or cup about the coil as well known.

It will be evident that the form of Figures 1 to 5 inclusive or the form of Figures 13 to 17 inclusive may be used interchangeably with any suitable primary indicator, such as that set forth in Figures 6 to 9 inclusive, and in any suitable indicator arrangement, as, for example, one of those illustrated in Figures 10, 11 and 12. It will be evident also that the primary indicator and the arrangement of connections to the source of the indication are subject to wide variation to suit the particular requirements of any individual installation.

In an alternate arrangement as shown in Figures 18 to 20 inclusive, the recording arm and the clip at the end supporting the marker are made integral from thin walled tubing, for example of stainless steel. The relatively rigid portion 55² is tubular in section, and the resilient end 56² is formed by flattening the tube, and bending at 59' to encircle and grip the marker 48, whose reservoir in this case extends transversely to the position of Figure 15.

Figures 21, 22, 25:
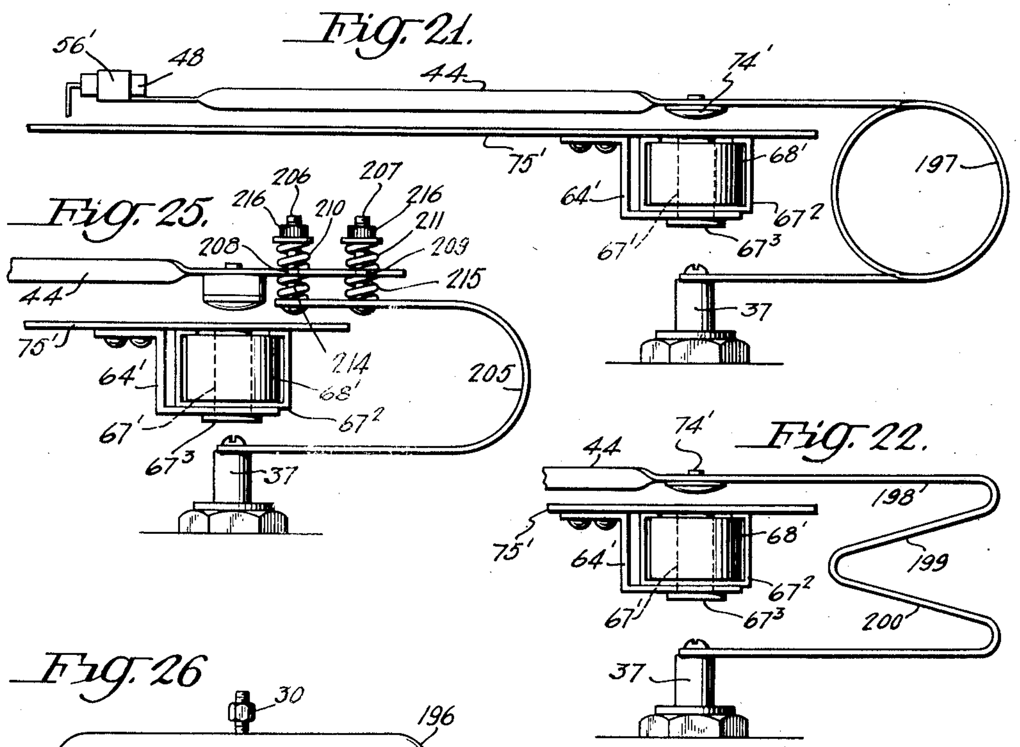

The axially resilient connection between the primary indicator and the recorder arm may take various forms as shown in Figures 21 to 25 inclusive, other than the reverse bends shown. For example, in Figure 21 we illustrate a variant having an axially resilient connection in the form of a spring loop 197 in a suitable plane, here a plane through the axis, and in this case preferably symmetrical with respect to the axis. The particular loop is circular, but this feature is unimportant. Torsional stresses in the loop may somewhat modify the vibration. In Figure 22 the axially resilient connection takes the form of a double return bend spring 198 having bend sections 199 and 200. This construction gives a high degree of axial resilience and is consistent with a high degree of lateral stiffness and resistance to deformation in other directions.

The simple return bend may also be split longitudinally to form twin return bends 201 and 204 symmetrically offset from the center line of the arm as shown in Figures 23 and 24. This form permits high axial resilience, with great resistance to deformation in other directions. Figure 25 shows a rigid return bend 205 having, near its connection to the rigid portion of the arm, pins 206 and 207 passing through holes 208 and 209 in the arm, and limiting helical compression springs 210 and 211 on one side of the arm and similar springs 214 and 215 on the other side. Nuts 216 are threaded on the ends of the pins to adjust the tension of the springs and control the axial freedom of the recording arm. While compression springs have been shown, the springs may be of any other type.

In Figure 26 a variation is illustrated in the form of Figures 13 and 14. As shown, the axis of rotation 37 of the primary indicator is located at 217 to the side of instead of above the chart, and the arm 44' extends horizontally with the marker moving in a generally vertical arc 218, over the upper middle portion of the circular chart. In this form the arm 44' is preferably a thin walled stainless steel tube as shown in Figures 18 to 20 inclusive.

Under some conditions of operation, as when the chart paper is in close contact with the chart plate at the marker, there is considerable tendency of the marker to rebound with considerable gain in amplitude of movement, accompanied by some irregularity of vibration. Steps are preferably taken to damp this excessive vibration.

One very effective corrective is by relieving or recessing the chart plate under the marker, or by cutting a slot 219 through the chart plate along the range of movement of the marker. By eliminating the support directly behind the paper along the path of the marker contact, the paper apparently is permitted to absorb the small increments of impact energy of vibration, which, if returned to the marker, result in undesirable interference with the original frequency.

A secondary advantage is obtained by slotting the metal chart plate used in this form of recorder. The preferably rectangular window symmetrical about the vertical chart center line permits illumination from an electric lamp 220 to shine through the slot and the chart. The marker then serves as a highly visible indicator. Upper and lower reference lines 221 and 224 are suitably provided, preferably in red.

To further reduce undesirably high implitude of vibration, the impressed frequency may to advantage in some cases be deliberately adjusted to a value slightly off resonance, or (which produces the same result) the marker may be resonated to a frequency slightly removed from the impressed frequency.

By the combined effect of leaving the paper unsupported under the marker and of maintaining the marker slightly off resonance (or of one of these expedients) it is possible to vibrate the marker without breaking the ink film on the paper. This has the decided advantage of avoiding an intermittent line (series of dots) and obtaining a continuous line, and also of avoiding blotting or tendency to pile up or splatter ink on the paper.

Figures 27 and 28 illustrate this condition. In Figure 27 the pen (ink discharge tube) 53 is at the end of its vibration cycle, on the paper 86, and the ink stream 225 is of course continuous to the paper. In Figure 28 the marker is at the opposite end of its vibration cycle, remote from the paper, but it only moves away a short distance, of the order of 0.005 inch maximum, and so does not break the ink column or stream 225. Thus the ink column is continuous and the marker line is continuous without splattering.

There is of course some spring-back of the paper under these conditions, and this permits an amplitude slightly greater than the distance which the pen leaves the paper without breaking the ink stream.

In view of our invention and disclosure, variations and modifications to meet individual whim or particular need will doubtless become evident to others skilled in the art, to obtain all or part of the benefits of our invention without copying the process and apparatus shown, and we, therefore, claim all such insofar as they fall within the reasonable spirit and scope of our claims.

Having thus described our invention what we claim as new and desire to secure by Letters Patent is:

1. In a recorder, a marker arm adapted to rotate about an axis in response to a quantity being recorded, a marker toward the opposite end of the arm from the axis and adapted to cooperate with a chart, a magnetically susceptible armature on the marker arm at the axis, an electromagnet acting directly on the armature along the axis and thereby vibrating the marker arm at the axis and alternating current means for energizing the electromagnet to vibrate the marker in contact with the chart.

2. In a recorder, a marker arm moving about an axis in response to a quantity being measured, having an axially resilient portion and tuned with respect to a particular frequency, a marker supported from the resilient portion of the arm remote from the axis and adapted to cooperate with a chart, a magnetically susceptible armature on the marker arm at the axis, an electromagnet acting directly on the armature along the axis and thereby vibrating the marker arm at the axis and alternating current means at substantially the frequency for which the marker arm is tuned for energizing the electromagnet to vibrate the marker in contact with the chart.

3. In a recorder, a marker arm moving about an axis in response to a quantity being measured, having an axially resilient portion and tuned with respect to a particular frequency, a marker supported from the resilient portion of the arm remote from the axis and adapted to cooperate with a chart, a magnetically susceptible armature on the marker arm at the axis, an electromagnet acting directly on the armature along the axis and thereby vibrating the marker arm at the axis and alternating current means slightly off with respect to the frequency for which the marker arm is tuned for energizing the electromagnet to vibrate the marker in contact with the chart and damp the marker.

4. In a recorder, a marker arm moving about an axis in response to a quantity being measured, having an axially resilient portion and tuned with respect to a particular frequency, a marker supported from the resilient portion of the arm remote from the axis and adapted to cooperate with a chart, a magnetically susceptible armature on the marker arm at the axis, an electromagnet acting directly on the armature along the axis and thereby vibrating the marker arm at the axis and alternating current means slightly off with respect to the frequency for which the marker arm is tuned for energizing the electromagnet to vibrate the marker in contact with the chart and by the off resonance character limiting the marker to an amplitude not exceeding 0.005 inch away from the chart.

5. In a recorder, a marker arm moving about an axis in response to a quantity being measured, having a resilient portion and tuned with respect to a particular frequency, a marker supported from the resilient portion of the arm remote from the axis and adapted to cooperate with a chart, a chart support for the chart having an opening at the point at which the marker is located, leaving the chart unsupported where it contacts the marker, a magnetically susceptible armature on the marker arm at the axis, an electromagnet acting directly on the armature along the axis and thereby vibrating the marker arm at the axis and alternating current means at substantially the frequency for which the marker arm is tuned for energizing the electromagnet to vibrate the marker in contact with the chart.

6. In a recorder, a marker arm moving about an axis in response to a quantity being measured, having a resilient portion and tuned with respect to a particular frequency, a marker supported from the resilient portion of the arm remote from the axis and adapted to cooperate with a chart, a chart support for the chart having an opening at the point at which the marker is located, leaving the chart unsupported where it contacts the marker, a magnetically susceptible armature on the marker arm at the axis, an electromagnet acting directly on the armature along the axis, and thereby vibrating the marker arm at the axis and alternating current means slightly off with respect to the frequency for which the marker arm is tuned for energizing the electromagnet to vibrate the marker in contact with the chart and damp the marker.

7. In a recorder, a marker arm moving about an axis in response to a quantity being measured, having a resilient portion and tuned with respect to a particular frequency, a marker supported from the resilient portion of the arm remote from the axis and adapted to cooperate with a chart, a chart support for the chart having an opening at the point at which the marker is located, leaving the chart unsupported where it contacts the marker, a magnetically susceptible armature on the marker arm at the axis, an electromagnet acting directly on the armature along the axis and thereby vibrating the marker arm at the axis and alternating current means slightly off with respect to the frequency for which the marker arm is tuned for energizing the electromagnet to vibrate the marker in contact with the chart and by the off resonance character limiting the marker to an amplitude not exceeding 0.005 inch away from the chart.

8. In a recorder, a primary indicator shaft turning in response to a quantity to be indicated, a marker arm on the shaft having a reverse bend at the axis, a marker on the arm towards the end remote from the shaft and adapted to contact a chart, a magnetically susceptible armature on the arm at the side of the reverse bend remote from the shaft and at the axis, the reverse bend being axially resilient, an electromagnet inside the reverse bend acting directly on the armature along the axis and thereby vibrating the marker arm at the axis and alternating current means for energizing the electromagnet to vibrate the marker in contact with the chart.

9. In a recorder, a primary indicator shaft turning in response to variation in a quantity being measured, a marker arm on the shaft having an axially resilient reverse bend and including a resilient marker support on the side of the reverse bend remote from the shaft and at a position remote from the axis, the marker arm being tuned with respect to a particular frequency, a marker supported from the resilient marker support and adapted to cooperate with a chart, a magnetically susceptible armature on the marker arm in line with the shaft axis on the side of the reverse bend remote from the shaft, an electromagnet acting directly on the armature at the axis from inside the reverse bend and thereby vibrating the marker arm at the axis, and alternating current means at substantially the frequency for which the marker arm is tuned for energizing the electromagnet to vibrate the marker in contact with the chart.

10. In a recorder, a marker arm adapted to rotate about an axis in response to a quantity being recorded, a marker towards the opposite end of the arm from the axis including an ink pen adapted to cooperate with a chart, a magnetically susceptible armature on the marker arm at the axis, an electromagnet acting directly on the armature along the axis and thereby vibrating the marker arm at the axis and alternating current means for energizing the electromagnet to vibrate the marker in contact with the chart, the amplitude of vibration under the particular alternating current means being so small at the pen that the ink stream remains continuous to the chart throughout the vibration.

11. In a recorder, a marker arm adapted to rotate about an axis in response to a quantity being recorded, the marker arm having a resilient connection at the axis, a resilient V-clip on the opposite end of the arm, a marker on the resilient V-clip adapted to cooperate with a chart, a magnetically susceptible armature on the marker arm at the axis, an electromagnet acting directly on the armature along the axis and thereby vibrating the marker arm at the axis, and alternating current means for energizing the electromagnet to vibrate the marker in contact with the chart, the V-clip when holding the marker having a natural frequency which is resonant with the alternating current frequency.

12. In a recorder, a primary indicator shaft turning in response to a quantity to be indicated, a marker arm on the shaft having a reverse bend at the axis, the reverse bend being axially resilient, a marker on the arm towards the end remote from the shaft and adapted to contact a chart, a magnetically susceptible armature on the arm at the side of the reverse bend remote from the shaft and at the axis, an electromagnet outside the reverse bend acting directly on the armature along the axis and thereby vibrating the marker arm at the axis, and alternating current means for energizing the electromagnet to vibrate the marker in contact with the chart.

13. In a recorder, a marker arm adapted to rotate about an axis in response to a quantity being recorded, having a resilient portion and tuned with respect to a particular frequency, a marker supported from the resilient portion of the arm remote from the axis and adapted to cooperate with a chart, a magnetically susceptible armature on the marker arm at the axis, an electromagnet acting directly on the armature along the axis and thereby vibrating the marker arm at the axis and alternating current means for energizing the electromagnet to vibrate the marker in contact with the chart.

14. In a recorder, a marker arm adapted to rotate about an axis in response to a quantity being recorded, a marker toward the opposite end of the arm from the axis and adapted to cooperate with a chart, a chart mounting for the chart rotatable about an axis transverse to the marker arm axis, a chart support having a curved portion conforming to the curved path of the marker, a magnetically susceptible armature on the marker arm at the axis, an electromagnet acting directly on the armature along the axis and thereby vibrating the marker arm at the axis and alternating current means for energizing the electromagnet to vibrate the marker in contact with the chart.

15. In a recorder, a chart mounting rotatably about the axis, a flat chart support extending in a plane transverse to the axis of the chart mounting, a marker arm adapted to rotate about an axis above and to one side of the chart support and in response to a quantity being recorded, a marker toward the opposite end of the arm remote from the marker arm axis and adapted to cooperate with a chart on the chart mounting, a magnetically susceptible armature on the marker arm at the marker arm axis, an electromagnet acting directly on the armature along the marker arm axis and thereby vibrating the marker arm at the marker arm axis, and alternating current means for energizing the electromagnet to vibrate the marker in contact with the chart.

DAVID ROBERT YARNALL.
JAMES W. WILLIAMS, 3RD.

REFERENCES CITED

The following references are of record in the file of this patent:

UNITED STATES PATENTS

| Number | Name | Date |
|---|---|---|
| 533,270 | Bristol | Jan. 29, 1895 |
| 626,848 | Wills | June 13, 1899 |
| 654,103 | Schrottke | July 17, 1900 |
| 872,193 | Orling | Nov. 26, 1907 |
| 974,190 | Robinson | Nov. 1, 1910 |
| 1,038,297 | Clawson | Sept. 10, 1912 |
| 1,131,892 | Alger | Mar. 16, 1915 |
| 1,513,889 | Brown | Nov. 4, 1924 |
| 1,521,007 | Chubb | Dec. 30, 1924 |
| 1,717,094 | Clokey | June 11, 1929 |
| 1,760,947 | Healey | June 3, 1930 |
| 2,125,983 | Bettison et al. | Aug. 9, 1938 |
| 2,158,468 | McCleary | May 16, 1939 |
| 2,269,240 | Anderson | Jan. 6, 1942 |
| 2,403,472 | Anderson | July 9, 1946 |
| 2,447,191 | Lingel | Aug. 17, 1948 |